United States Patent [19]

Denedios

[11] Patent Number: 5,642,415
[45] Date of Patent: Jun. 24, 1997

[54] MODULAR ATTENUATOR

[76] Inventor: Tom Denedios, 3701 S. 7th St., Fort Pierce, Fla. 34982

[21] Appl. No.: 690,853

[22] Filed: Aug. 1, 1996

[51] Int. Cl.$^6$ ................................................. H04M 7/04
[52] U.S. Cl. ........................ 379/398; 379/395; 379/394
[58] Field of Search ................................ 379/398, 395, 379/394, 414, 415, 416, 417, 399

[56] References Cited

U.S. PATENT DOCUMENTS

| | | |
|---|---|---|
| 652,230 | 6/1900 | Pupin . |
| 2,645,681 | 7/1953 | Green . |
| 4,123,626 | 10/1978 | Munter . |
| 4,220,834 | 9/1980 | Holce et al. . |
| 4,600,816 | 7/1986 | McDermott . |
| 4,961,219 | 10/1990 | Patel . |

*Primary Examiner*—Ahmad F. Matar
*Assistant Examiner*—Keith Ferguson
*Attorney, Agent, or Firm*—Michael Drew

[57] ABSTRACT

A modular signal attenuator is provided by resistors (R1, R2 and R3, R4) connected in respective series for connection in each branch of tip and ring telephone circuitry. A pair of capacitors (C1, C2) connected to equate to a non-polar capacitor and a resistor (R5) connected in series are shunted across the serially-connected resistors (R1, R2 and R3, R4) between adjacent resistors (R1 and R2, R3 and R4) of each series of resistors in the tip and ring branches.

6 Claims, 1 Drawing Sheet

MODULAR ATTENUATOR

TECHNICAL FIELD OF THE INVENTION

The present invention relates to attenuation of signals in data-transmission systems, and more particularly to a compact modular attenuator for transmission of data signals through a standard telephone communication system.

BACKGROUND OF THE INVENTION

Advances in electronic technology have enabled various types of data signals to be transmitted through standard telephone transmission lines. An example of such a non-standard data signal transmitted across telephone lines is a telecopier, or facsimile, signal (also commonly referred to as a "fax"). Transmission of non-standard data signals across standard telephone communications equipment has often created problems in that standard telephone communication equipment is not generally designed to handle some types of data signals. One of the problems created is that the amplitude of some transmitted data signals is too great for successful data transmission. Thus, it can be appreciated that it would be useful to have a means for attenuating non-standard data signals which are transmitted through a standard telephone communications system. Since not all telephone subscribers transmit and receive data signals, it can be further appreciated that it would be useful to have a means for attenuating non-standard data signals in a standard telephone communications system which means is easily insertable at the customer interface.

SUMMARY OF THE INVENTION

It is an object of the present invention to provide a means for attenuating signals transmitted through standard telephone communications systems.

It is a further object of the invention to provide a compact modular means for achieving such attenuation at individual subscriber interfaces.

According to a preferred embodiment of the invention, a modular signal attenuator is provided by resistors connected in series in each branch of tip and ring telephone circuitry. A pair of capacitors and a resistor connected in series are shunted across the serially-connected resistors between adjacent resistors of each series of resistors in the tip and ring branches.

Other aspects, objects, features, and advantages of the present invention will become apparent to those skilled in the art upon reading the detailed description of preferred embodiments.

DETAILED DESCRIPTION OF PREFERRED EMBODIMENTS OF THE INVENTION

Figure 1:
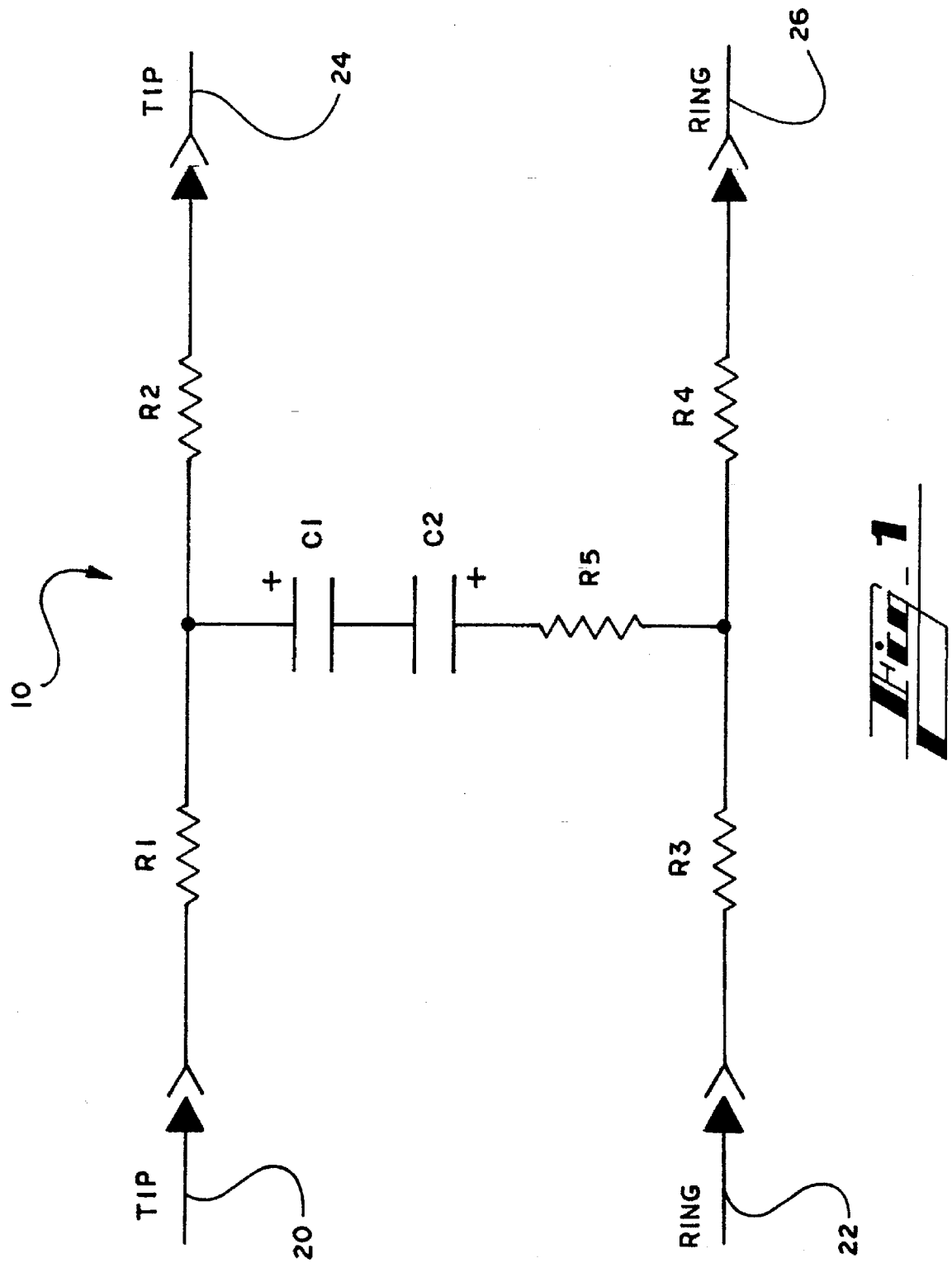
FIG. 1 is a schematic diagram of a compact modular attenuator for a standard telephone communications circuit in accordance with a preferred embodiment the invention.

While the specification concludes with claims particularly pointing out and distinctly claiming the subject matter which is regarded as the present invention, the invention will now be described with reference to the following description of a preferred embodiment taken in conjunction with the accompanying drawing. Referring to FIG. 1, there is shown a schematic diagram of a compact modular attenuator 10 for a standard telephone communications system. The attenuator 10 is shown in a modular configuration insertable between the tip 20 and ring 22 branches of the telephone company line and the tip 24 and ring 26 branches of customer/subscriber equipment. Resistors R1 and R2 are connected in series in the tip branch of circuitry while resistors R3 and R4 are connected in series in the ring branch of circuitry. Capacitors C1 and C2 are connected in series in negative polarity with one another with a resistor R5 connected in series to one of the capacitors C2. The capacitors are connected in a manner which equates to a non-polar capacitor of suitable size for the compactness desired in the invention. The serial tandem of the capacitors C1, C2 and resistor R5 is connected in shunt fashion between the resistors R1, R2 of the tip branch of circuitry and the resistors R3, R4 of the ring branch of circuitry.

Attenuation achieved by the modular attenuator of the invention is measured in loss of decibels (dB). The greater the loss measured in dB, the greater the attenuation. Suitable values for attaining attenuation in the preferred embodiment of the invention is illustrated in the following table.

| Loss @ 1 kHz (dB) | R1, R2, R3, R4 (ohms) | R5 (ohms) | C1, C2 mF, volts |
|---|---|---|---|
| 8 | 130 | 560 | 2.2, 250 |
| 7 | 110 | 732 | 2.2, 250 |
| 6 | 100 | 820 | 2.2, 250 |
| 5 | 82 | 1,000 | 2.2, 250 |
| 4 | 68 | 1,300 | 2.2, 250 |
| 3 | 51 | 1,600 | 2.2, 250 |
| 2 | 37 | 2,800 | 2.2, 250 |
| 1 | 16 | 5,100 | 2.2, 250 |
| .1 | 0 | 0 | 2.2, 250 |

The invention provides a compact modular means for attenuating the amplitudes of data signals transmitted across standard telephone lines. When fitted with standard telephone equipment connecting jacks the device 10 may be easily inserted by a telephone service subscriber between telephone company lines and the subscriber's equipment. Compactness for the modular unit is achieved in part through the use of smaller capacitors such as miniature electrolytic capacitors connected so as to be non polar but still possess suitable capacitance for the effectiveness of the invention.

While the specification concludes with claims particularly pointing out and distinctly claiming the subject matter which is regarded as the present invention, the invention will now be described with reference to the following description of embodiments taken in conjunction with the accompanying drawings.

What is claimed is:

1. A compact modular attenuator comprising:
    a first connector for respective connection to tip and ring branches of communications circuitry;
    a second connector for respective connection to tip and ring branches of subscriber telephone equipment;
    a first resistor and a second resistor connected in series between tip sides of said first and second connectors;
    a third resistor and a fourth resistor connected in series between ring sides of said first and second connectors; and
    at least one capacitor having a condition of nonpolarity connected in series with a fifth resistor, connected as a shunt between said first and second resistors and said third and fourth resistors;
    wherein said first, second, third and fourth resistors have equal values.

2. The invention of claim 1, said at least one capacitor comprising a pair of miniature capacitors.

3. An attenuator comprising:

a first connector for respective connection to tip and ring branches of communications circuitry;

a second connector for respective connection to tip and ring branches of subscriber telephone equipment;

a first resistor and a second resistor connected in series between tip sides of said first and second connectors;

a third resistor and a fourth resistor connected in series between ring sides of said first and second connectors; and a plurality of capacitors connected in series so as to equate to a nonpolarized capacitor connected in series with a fifth resistor, connected as a shunt between said first and second resistors and said third and fourth resistors;

wherein said first, second, third and fourth resistors have equal resistance values.

4. A compact modular attenuator consisting essentially of:

a first connector for respective connection to tip and ring branches of communications circuitry;

a second connector for respective connection to tip and ring branches of subscriber telephone equipment;

a first resistor and a second resistor connected in series between tip sides of said first and second connectors;

a third resistor and a fourth resistor connected in series between ring sides of said first and second connectors; and at least one capacitor having a condition of nonpolarity connected in series with a fifth resistor, connected as a shunt between said first and second resistors and said third and fourth resistors;

wherein said first, second, third and fourth resistors have equal values.

5. The invention of claim 4, said at least one capacitor comprising a pair of miniature capacitors.

6. An attenuator consisting essentially of:

a first connector for respective connection to tip and ring branches of communications circuitry;

a second connector for respective connection to tip and ring branches of subscriber telephone equipment;

a first resistor and a second resistor connected in series between tip sides of said first and second connectors;

a third resistor and a fourth resistor connected in series between ring sides of said first and second connectors; and a plurality of capacitors connected in series so as to equate to a nonpolarized capacitor connected in series with a fifth resistor, connected as a shunt between said first and second resistors and said third and fourth resistors;

wherein said first, second, third and fourth resistors have equal resistance values.

* * * * *